United States Patent Office 3,459,468
Patented Aug. 5, 1969

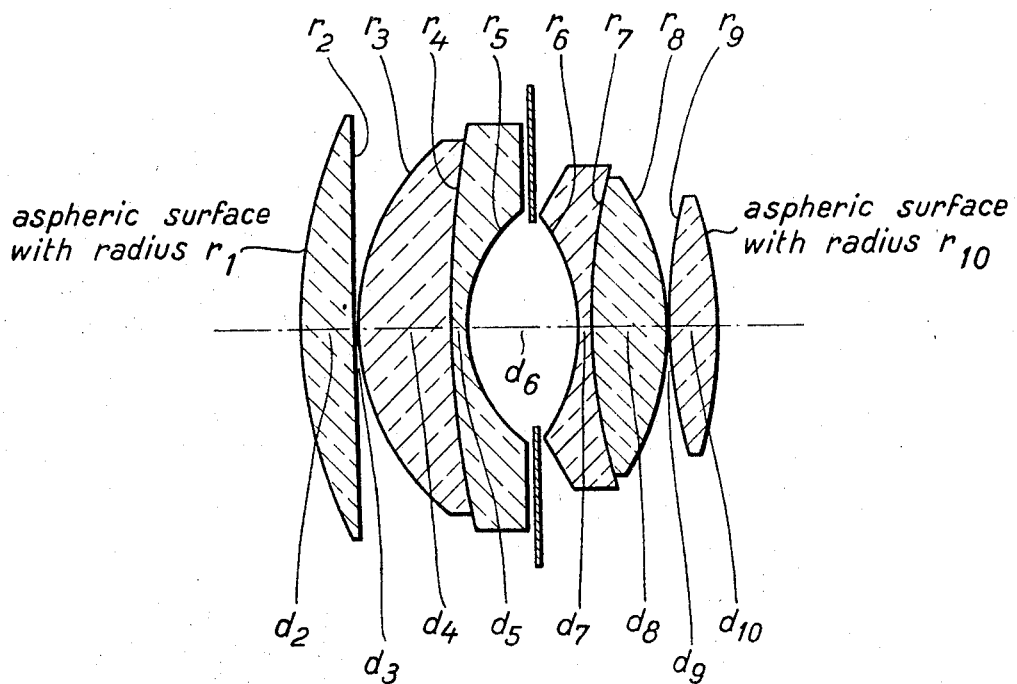

3,459,468
TWO-ASPHERICAL-SURFACED, HIGH SPEED PHOTOGRAPHIC OBJECTIVE LENS
Helmut Marx and Paul Sindel, Wetzlar, Germany, assignors to Ernst Leitz, G.m.b.H., Wetzlar, Germany
Filed Apr. 19, 1965, Ser. No. 449,192
Claims priority, application Germany, Apr. 25, 1964,
L 47,701
Int. Cl. G02b 3/04
U.S. Cl. 350—176                                    1 Claim

ABSTRACT OF THE DISCLOSURE

A photographic objective including a stop and having at least two aspherical surfaces, the apertures and image angles of which are large relative to one another. The aspherical surfaces are positioned in the front and rear portions of the objective so that aberrations of higher order may be directly modified. The aspherical surfaces permit alterations of the distribution of the Seidel aberrations throughout the optical system and thus permits modification of the arrangement of the lenses and their respective optical properties. Effective although indirect correction for image aberrations of higher order is thus permitted.

---

The invention relates to photographic lens systems each comprising at least two aspherical surfaces the aperatures and image angles of which are large relative to one another.

By the use of aspheric surfaces which are positioned in the front and rear portions of the objective, aberrations of higher order may be directly modified. Additionally, the aspheric surfaces permit alteration of the distribution of the Seidel aberrations throughout the optical system and thus permits modification of the arrangement of the lenses and their respective optical properties. In this manner, the provision of these aspheric surfaces permits effective although indirect correction for image aberrations of higher order.

The invention is described in greater detail with reference to the accompanying drawing forming a part hereof.

The drawing is a schematic view in axial section showing a photographic objective lens embodying the invention.

It has been found advantageous to use at least two aspheric surfaces in such objectives which comprise in the portion positioned ahead of the stop at least one positive lens in a series numbered from No. 1 to No. $(a-1) \geq 1$. This lens may be either a simple lens or a compound lens with cemented or broken contact, where the front surfaces $V_1 \ldots V_{a-1}$ of these lenses are concave towards the stop, and which are followed by another front-surface $V_a$ which is likewise concave towards the stop, and where, behind the stop, there is positioned at least one positive lens (simple or compound having cemented or broken contact) No. $(u-1) \geq 1$ to No. 1, which last named lenses have their rear surfaces (righthand surfaces as viewed in the drawing) $H_{u-1} \ldots H_1$ concave towards the stop and ahead (to the left) of which is placed a rear lens surface $H_u$ which is likewise concave towards the stop.

According to this invention, at least one of the objective surfaces positioned ahead of the surface $V_a$, or this surface $V_a$ itself, is formed aspherically in such a manner that in Seidel's approximation their asphericity produces a contribution to the Seidel coefficient $S_1$ of spherical aberration which is negative. At the same time, at least one of the objective surfaces which lie behind the surface $H_u$, or this surface $H_u$ itself, is formed aspherically in such manner that in the Seidel approximation its contribution to the Seidel coefficient $S_1$ is likewise negative. Furthermore, in accordance with the present invention, the value $p$ which is related to the surface power and which is expressed by the formula $$p \equiv h \left( \frac{n'+2}{2n'+1} \bigg/ s' - \frac{n+2}{2n+1} \bigg/ s \right)$$

should not show great variations for the surfaces $V_1$ to $V_a$ and specifically, the following inequality should be met:

$$\tfrac{1}{2}|p(V_i) - p(V_j)| \leq 0.15 \quad (i=1 \ldots a; j=1 \ldots a)$$

Furthermore, the value of $p$ for the rear surfaces $H_u$ to $H_1$ should not show great variations and the following inequality should be met:

$$\tfrac{1}{2}|p(H_k) - p(H_l)| \leq 0.15 \quad (k=1 \ldots u; l=1 \ldots u)$$

In the formula for $p$ the following terms are used:

$h$ the (relative) paraxial height;
$s$ resp. $s'$ are the paraxial intersection distance ahead or behind a surface after reduction of the system to the focal length 1;
$n$ is the refractive index of the medium to the left of the surface in question; and
$n'$ is the refractive index of the medium to the right of the surface. By paraxial intersection distance is meant the distance from a refracting surface to the corresponding intermediate image surface.

Objectives constructed as described above include, by way of example, either simple or modified Gauss type objectives and also known types of wide-angle objectives which may have, at the first position of the system, at least one negative meniscus and which in the following portion may be similar to an objective of the Gauss type. It is however to be understood that the invention is not limited to such types of objectives and that they merely exemplify objectives to which the invention may be applied.

It has been found to be of advantage to apply the aspheric configuration to surfaces which, respectively, lie as far as possible to the front and as far as possible to the rear, so that a maximum independence of the respective effects of these two asphericities may be obtained.

By the application of the teachings of the invention it becomes possible to correct objectives simultaneously for relatively large apertures and large image angles. By way of example, if the teachings of the invention are applied to a photographic objective of the simple Gauss type (simple positive front lens, cemented negative meniscus, stop, cemented negative meniscus, single positive rear lens) it is possible to make the maximum rim ray aberrations at the film so small that such an objective having a speed of 1:1.2, a focal length of 52 mm. and an image size of 24 x 36 mm. will not produce an objectionable spreading of light, even when taking pictures at night with glaring lights in the image field.

Due to the extremely small amount of asphericity it is not possible to illustrate this feature in the drawing. The data for such an objective are given in the table below in which the surfaces No. 1 and No. 10 are aspheric. After reduction of the objective to a focal length of 1, the configurations of these aspheric surfaces are defined by the coefficients $c^{(i)}$ arising in the power series for the "height of segment" $c$ in terms of $b \equiv \tfrac{1}{2}L^2$. The value $$L \equiv \sqrt{y^2 + c^2}$$

and is the length of the chord drawn from vertex of the surface to the particular point of the aspheric surface, where $y$ is the radial distance of this point from the axis of the lens and $c$ its height of segment or axial distance from the vertex plane of the surface. The power series for $c$ in terms of $b$ is as follows:

$$c = c^{(1)}b + c^{(2)}b^2 + c^{(3)}b^3 + c^{(4)}b^4 + c^{(5)}b^5 + c^{(6)}b^6$$

TABLE

Aperture 1:1.2
$f=1$
Image angle $2 \times 22\tfrac{1}{2}° = 45°$

| No. | d | r | $n_e'$ | $v_e'$ |
|---|---|---|---|---|
| 1 | −0.722 | 1.151 | 1.821 | 45.2 |
| 2 | 0.130 | 4.571 | 1 | |
| 3 | 0.004 | 0.575 | 1.900 | 40.5 |
| 4 | 0.226 | 2.434 | 1.792 | 25.9 |
| 5 | 0.042 | 0.349 | 1 | |
| 6 | 0.270 | −0.450 | 1.844 | 30.0 |
| 7 | 0.031 | 1.385 | 1.900 | 40.5 |
| 8 | 0.181 | −0.665 | 1 | |
| 9 | 0.001 | 1.180 | 1.694 | 54.6 |
| 10 | 0.117 | −1.073 | 1 | |

In the above table, $d$ for surface No. 1 denotes the distance of the vertex of the surface No. 1 from the entrance pupil.

$1/r_1 = c_1^{(1)}$ is the curvature of the vertex of surface No. 1. $1/r_{10} = c_{10}^{(1)}$ is the curvature of the vertex of surface No. 10.

The coefficients $c^{(1)}$ to $c^{(6)}$ of the two aspheric surfaces No. 1 and No. 10 have the following values:

| No. | $c^{(1)}$ | $c^{(2)}$ | $c^{(3)}$ | $c^{(4)}$ | $c^{(5)}$ | $c^{(6)}$ |
|---|---|---|---|---|---|---|
| 1 | 0.869 | −0.188 | 0.2 | 0 | −16 | 100 |
| 10 | −0.932 | 1.889 | −12 | 0 | 233 | 1,670 |

Conventional measures of adjustment, such as small variations in the powers of individual lenses, or recalculations based on other glasses or in connection therewith the introduction of further cemented surfaces, or the introduction of short air gaps of low refracting power or the addition of thin lenses of low power, the separation of surfaces which are shown cemented, and similar measures will operate within the scope of the above given numerical examples, provided the following conditions are met:

The number of glass-air surfaces, with the exception of such surfaces belonging to (or forming) narrow air-gaps of low refracting power, or which are surfaces of thin lenses of low power, is eight; after reducing the system to the focal length 1, each of these eight surfaces has, first, a modified refracting power corresponding to a value $p_i$, which does not deviate more than ±0.10 from the value $p_j$ for the corresponding surface of the above numerical example, and secondly, the Seidel distance $$t_i = \sum_{\alpha=1}^{i} \frac{d_\alpha/n_\alpha}{h_{\alpha-1} h_\alpha}$$

from the actual entrance pupil, or from a possible entrance pupil having a different location, should not deviate more than ±0.10 from the Seidel distance $t_j$ of the corresponding surface of the given numerical example.

While we have shown and described what we believe to be the best embodiments of our invention, it will be apparent to those skilled in the art that various changes and modifications may be made therein without departing from the spirit and scope of the invention.

What is claimed is:

1. A photographic objective wherein ten lens surfaces are provided and in which said objective has the following characteristics:

Opening 1—1.2
Image angle—45°

The following values for the surfaces in units of length are for an objective having a focal length of one unit of length:

| Surface No. | Distance to preceding surface, d | Radius of curvature, r | Index of refraction beyond surface $n_e'$ | $v_e'$ |
|---|---|---|---|---|
| 1 | −0.722 | 1.151 | 1.821 | 45.2 |
| 2 | 0.130 | 4.571 | 1 | |
| 3 | 0.004 | 0.575 | 1.900 | 40.5 |
| 4 | 0.226 | 2.434 | 1.792 | 25.9 |
| 5 | 0.042 | 0.349 | 1 | |
| 6 | 0.270 | −0.450 | 1.844 | 30.0 |
| 7 | 0.031 | 1.385 | 1.900 | 40.5 |
| 8 | 0.181 | −0.665 | 1 | |
| 9 | 0.001 | 1.180 | 1.694 | 54.6 |
| 10 | 0.117 | −1.073 | 1 | | surfaces No. 1 and No. 10 are aspheric;

$d$ for surface No. 1 is the distance of the vertex of surface No. 1 from the entrance pupil;

$r$ for surfaces No. 1 and No. 10 is the radius of curvature at the vertex of the aspheric surface;

the aspheric surfaces 1 and 10 have the following configuration:

$$c = c^{(1)}b + c^{(2)}b^2 + c^{(3)}b^3 + c^{(4)}b^4 + c^{(5)}b^5 + c^{(6)}b^6$$

wherein $c$ is the axial distance of any particular point on the surface from the vertex plane thereof and $$b = \tfrac{1}{2}(y^2 + c^2)$$

where $y$ is the radial distance of the particular point from the axis of the lens and the coefficients $c^{(i)}$ of the power series are as set forth in the following table:

| No. | $c^{(1)}$ | $c^{(2)}$ | $c^{(3)}$ | $c^{(4)}$ | $c^{(5)}$ | $c^{(6)}$ |
|---|---|---|---|---|---|---|
| 1 | 0.869 | −0.188 | 0.2 | 0 | −16 | 100 |
| 10 | −0.932 | 1.889 | −12 | 0 | 233 | 1,670 |

References Cited

UNITED STATES PATENTS

| 2,100,290 | 11/1937 | Lee | 350—189 |
| 2,250,337 | 7/1941 | Warmisham | 350—176 |
| 2,532,752 | 12/1950 | Baker | 350—222 |
| 2,986,071 | 5/1961 | Baker | 350—189 X |

JOHN K. CORBIN, Primary Examiner

U.S. Cl. X.R.
350—189, 222